United States Patent
Kawakami et al.

(10) Patent No.: US 10,649,311 B2
(45) Date of Patent: May 12, 2020

(54) FOCAL-PLANE SHUTTER AND IMAGING DEVICE

(71) Applicant: Nidec Copal Corporation, Tokyo (JP)

(72) Inventors: Kenta Kawakami, Tokyo (JP); Ushio Uemura, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 16/304,006

(22) PCT Filed: May 22, 2017

(86) PCT No.: PCT/JP2017/018985
§ 371 (c)(1),
(2) Date: Nov. 21, 2018

(87) PCT Pub. No.: WO2017/204140
PCT Pub. Date: Nov. 30, 2017

(65) Prior Publication Data
US 2019/0227407 A1    Jul. 25, 2019

(30) Foreign Application Priority Data
May 26, 2016   (JP) .................. 2016-104738

(51) Int. Cl.
*G03B 9/34* (2006.01)
*G03B 9/36* (2006.01)
(Continued)

(52) U.S. Cl.
CPC .................. *G03B 9/36* (2013.01); *C22F 1/10* (2013.01); *C23C 18/32* (2013.01); *G03B 9/42* (2013.01); *C22F 1/00* (2013.01)

(58) Field of Classification Search
CPC ............... G03B 9/28; G03B 9/32; G03B 9/34
(Continued)

(56) References Cited

U.S. PATENT DOCUMENTS 3,674,425 A * 7/1972 Robson et al. ......... C01B 39/30
423/700
2003/0128976 A1   7/2003 Ichinose et al.
(Continued)

FOREIGN PATENT DOCUMENTS

| JP | 2003-131288 A | 5/2003 |
| JP | 2004-325553 A | 11/2004 |
| JP | 2005-155673 A | 6/2005 |

OTHER PUBLICATIONS

International Search Report dated Aug. 15, 2017 during the prosecution of International Patent Application No. PCT/JP2017/018985.

*Primary Examiner* — Clayton E. LaBalle
*Assistant Examiner* — Fang-Chi Chang
(74) *Attorney, Agent, or Firm* — Troutman Sanders LLP

(57) ABSTRACT

Provides a focal-plane shutter comprising: a base plate that has an opening portion for exposure; a blade group for opening and closing the opening portion; an arm that is linked to a blade group; and a driving mechanism portion, linked to the arm, for driving the blade group through the arm, wherein: the blade group and the arm are linked through a coupling plated with a metal crystallized structure with crystallization degree of no less than 99%. This focal-plane shutter can improve the wear durability of a coupling for linking a blade group and an arm. This can prevent the production of wear debris, and prevent the coupling from becoming brittle through wear, even given repeated operations.

8 Claims, 3 Drawing Sheets

(51) Int. Cl.
 *C23C 18/32* (2006.01)
 *C22F 1/10* (2006.01)
 *G03B 9/42* (2006.01)
 *C22F 1/00* (2006.01)

(58) Field of Classification Search
 USPC .......................................... 396/481; 359/739
 See application file for complete search history.

(56) References Cited

U.S. PATENT DOCUMENTS

2004/0213561 A1  10/2004  Ichinose et al.
2005/0108878 A1  5/2005  Nishimura et al.

\* cited by examiner

[FIG. 1]
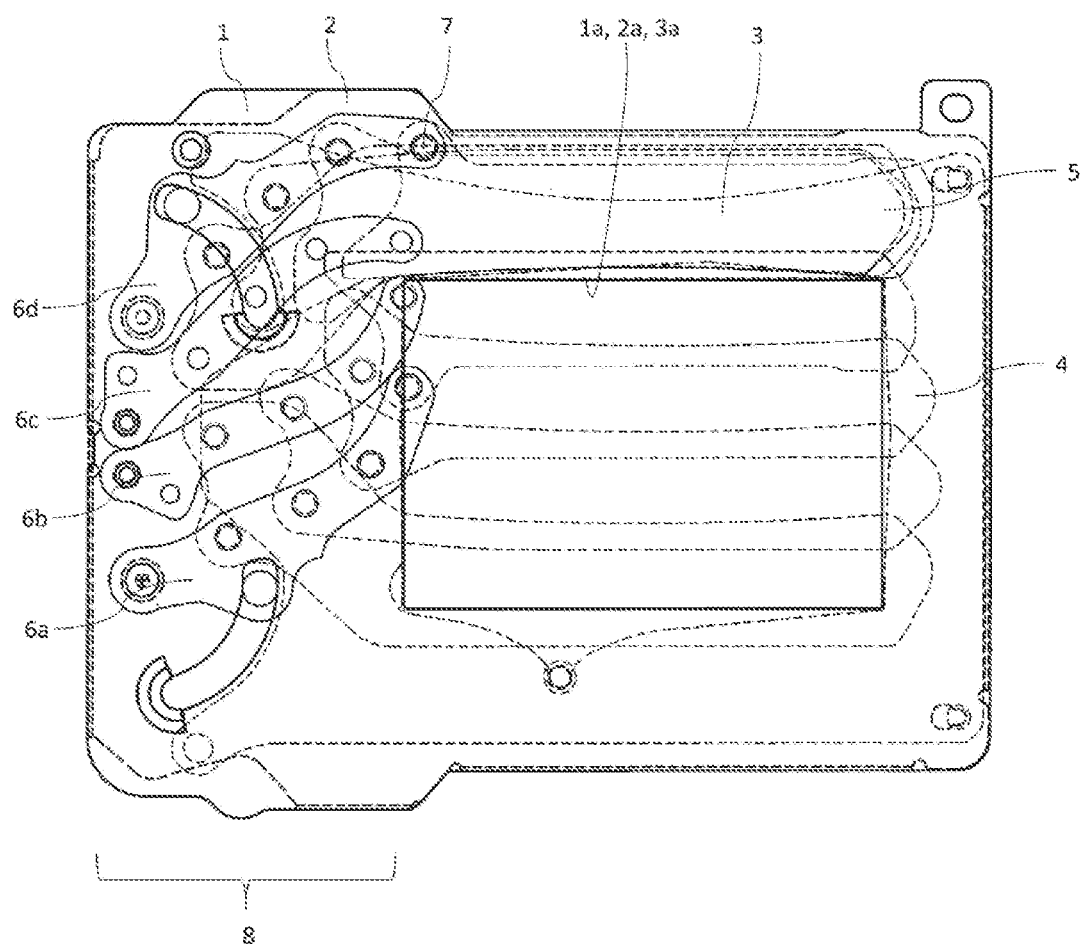

[FIG. 2]
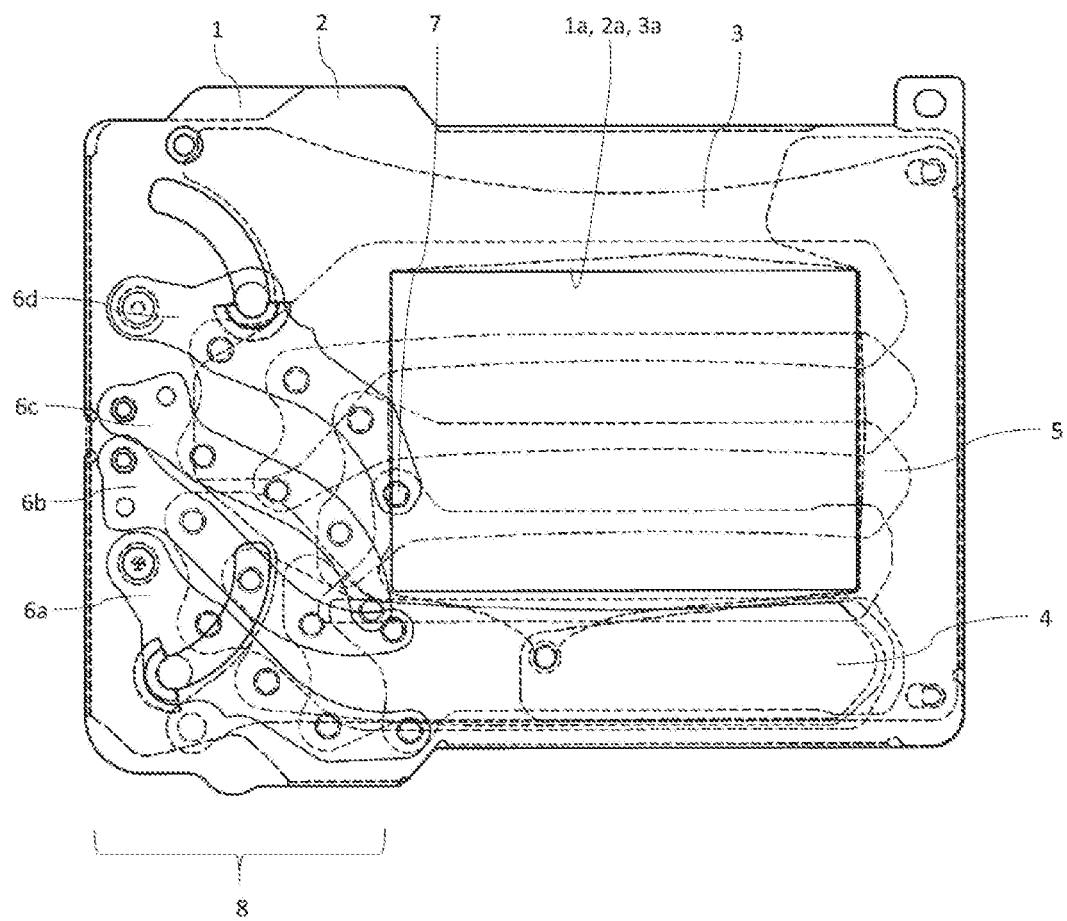

[FIG. 3]
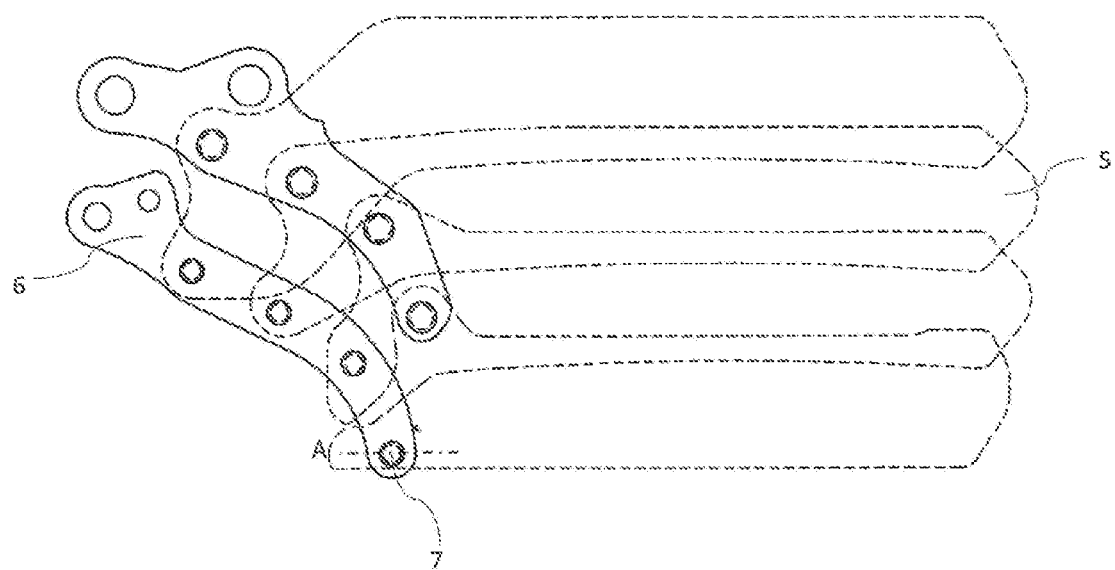
[FIG. 4]
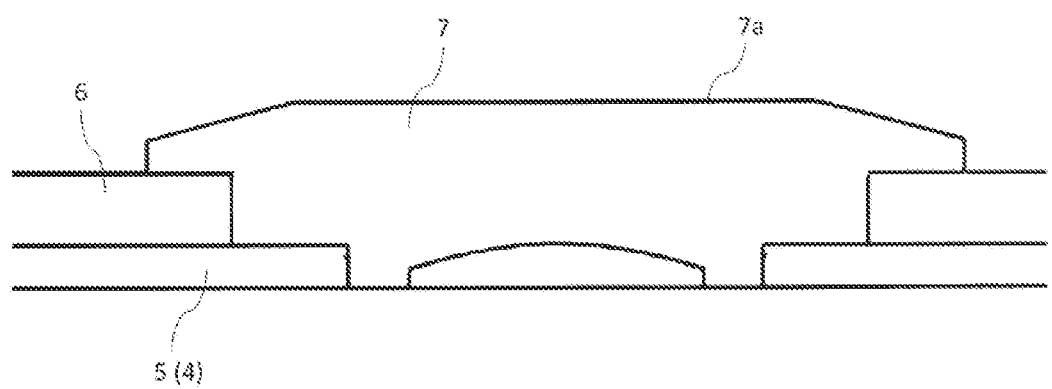

FOCAL-PLANE SHUTTER AND IMAGING DEVICE

CROSS-REFERENCE TO RELATED APPLICATIONS

This is a U.S. national phase application under 35 U.S.C. § 371 of International Patent Application No. PCT/JP2017/018985, filed May 22, 2017, and claims benefit of priority to Japanese Patent Application No. 2016-104738, filed May 26, 2016. The entire contents of these applications are hereby incorporated by reference.

FIELD OF TECHNOLOGY

One aspect of the present invention relates to a focal-plane shutter used in an imaging device such as a camera.

BACKGROUND

In a focal-plane shutters for carrying out exposure of an imaging element or film through opening/closing an opening portion (frame) through a blade group, there are those that are structured such that a blade group that is disposed in a blade chamber that is formed between a base plate and a supplementary base plate is driven by a driving mechanism portion so as to change the state of opening/closing of the opening portion so as to carry out exposure. In such focal-plane shutters, the driving mechanism portion and the blade group are linked through a blade arm by a blade dowel, or the like. When the focal-plane shutter is operated, the blade dowel of the blade arm is operated while in contact with the shutter base plate or supplementary base plate, or the like, and thus the blade dowel becomes worn by the friction during operation. Japanese Unexamined Patent Application Publication 2004-325553, for example, discloses a technology for performing a plating process, such as nickel plating, on the blade dowel in order to prevent such wearing of the blade dowel.

SUMMARY

However, the plating process such as described in Japanese Unexamined Patent Application Publication 2004-325553 is inadequate, and there is still the need for a countermeasure for wear.

The present invention adopts means such as the following in order to solve the problem described above. Note that while in the explanation below, reference symbols from the drawings are written parentheses for ease in understanding the present invention, the individual structural elements of the present invention are not limited to those that are written, but rather should be interpreted broadly, in a range that could be understood technically by a person skilled in the art.

One means according to the present invention is: a focal-plane shutter comprising: a base plate that has an opening portion for exposure; blade groups for opening and closing the opening portion; an arm that is linked to a blade group; and a driving mechanism portion, linked to the arm, for driving the blade group through the arm, wherein the blade group and the arm are linked through a coupling plated with a metal crystallized structure with crystallization degree of no less than 99%.

The focal-plane shutter of the structure set forth above can improve the wear durability of the couplings that link the blade groups and the arms. This can prevent the production of wear debris, and prevent the coupling from becoming brittle through wear, even given repeated operations.

In particular, when the crystallization degree of the coupling is essentially 100%, the wear durability of the coupling will be even higher, and thus this is preferred.

In the focal-plane shutter set forth above, preferably:
the plating of the metal crystallized structure is formed through a precipitation hardening treatment for no less than one hour at a precipitation hardening temperature of approximately 600° C.

The focal-plane shutter with the structure set forth above enables the plating material to be converted, through a relatively simple process, to a metal crystallized structure of essentially 100% crystallization degree.

Note that when carrying out the plating of the metal crystallized structure, the precipitation hardening treatment may be carried out for 30 minutes or more at a precipitation hardening temperature of between 570° C. and 630° C. This process also enables conversion of the plating material into a high-hardness metal crystallized structure having adequately high crystallization degree.

Moreover, the precipitation hardening treatment may be for a time of one hour and 30 minutes or less. This process enables the plating material to be caused to have adequately high crystallization degree of about 100%.

Additionally, in the shutter set forth above, preferably the plating of the metal crystallized structure has an Hv hardness of no less than 400 and no greater than 750.

The focal-plane shutter structured as set forth above can further increase the wear durability of the coupling.

In particular, preferably the plating of the metal crystallized structure has an Hv hardness of no less than 600 and no greater than 750.

Moreover, the present invention includes an imaging device such as a camera that is equipped with any of the focal-plane shutters set forth above.

The imaging device of the structure set forth above enables structuring of a device with high durability, because the wear durability of the coupling between the blade group and the arm has been increased. Moreover, because there is less of a tendency for the production of wear debris, this can prevent a reduction in image quality of the image that is captured, caused by wear debris adhering to the imaging element.

BRIEF DESCRIPTIONS OF THE DRAWINGS

FIG. 1 is a plan view of a focal-plane shutter before blade travel.

FIG. 2 is a plan view of the focal-plane shutter after blade travel.

FIG. 3 is an enlarged view of the focal-plane shutter arm and blade groups.

FIG. 4 is an enlarged cross-sectional view of the blade dowel part for linking the arm and the blade group.

DETAILED DESCRIPTION

Embodiments according to the present invention will be explained in detail below, referencing the drawings, following the structures below. However, the embodiment explained below is no more than an example of the present invention, and must not be interpreted as limiting the technical scope of the present invention. Note that in the various drawings, identical reference symbols are assigned to identical structural elements, and explanations thereof may be omitted.

EXAMPLES

In the focal-plane shutter according to the present embodiment, one distinctive feature is that the plating that is performed on the coupling (for example, a blade dowel) for linking the blade group and arm is a metal crystallized structure of crystallization degree of approximately 100%, so that the wear durability of the coupling is improved thereby. The embodiment of the present invention will be explained in detail below.

FIG. 1 and FIG. 2 are plan views of the focal-plane shutter according to the present embodiment, wherein FIG. 1 shows the state prior to blade travel and FIG. 2 shows the state after blade travel. FIG. 3 is an enlarged view of the arm and the trailing blade group of the focal-plane shutter according to the present embodiment. FIG. 4 is a cross-sectional view of the part in A of FIG. 3, and is an enlarged view of the play dowel part for linking the arm and the trailing blade group.

As depicted in FIG. 1 through FIG. 3, the focal-plane shutter according to the present embodiment is structured including: a base plate 1; a supplementary base plate 2; a middle plate 3; a leading blade group 4; trailing blade group 5; arms 6a through 6d; a driving mechanism portion 8; and the like. The arms 6a through 6d are linked through blade dowels 7 to the leading blade group 4 or trailing blade group 5 so as to enable relative rotation. Note that in the explanation below, the leading blade group 4 and the trailing blade group 5 are termed "blade groups," as a general term. Moreover, the arms 6a through 6d are termed "arms 6," as a general term.

<Base Plate 1>

The base plate 1 is a substrate part for the focal-plane shutter, and is formed with a rectangular opening portion 1a that functions as an exposure opening (frame). As illustrated in FIG. 1 and FIG. 2, the driving mechanism portion 8 is mounted on the base plate 1.

<Supplementary Base Plate 2>

The supplementary base plate 2 is attached, at a position facing the base plate 1, at a prescribed distance from the base plate 1. A rectangular opening portion 2a, that is similar to the opening portion 1a that is formed in the base plate 1, is formed in the supplementary base plate 2. The space defined between the base plate 1 in the supplementary base plate 2 serves as a blade chamber for containing a middle plate 3, a leading blade group 4, a trailing blade group 5, and the like.

<Middle Plate 3>

The middle plate is contained in the blade chamber that is defined by the base plate 1 and the supplementary base plate 2, as described above. A rectangular opening portion 3a, similar to the opening portions 1a and 2a that are formed, respectively, in the base plate 1 and the supplementary base plate 2, is formed in the middle plate 3. The middle plate 3 is disposed between the blades so as to define spaces for containing the leading blade group 4 and the trailing blade group 5. For example, the leading blade group 4 is disposed between the base plate 1 and the middle plate 3 and the trailing blade group 5 is disposed between the supplementary base plate 2 and the middle plate 3.

The region wherein the opening portions 1a, 2a, and 3a that are formed in the base plate 1, the supplementary base plate 2, and the middle plate 3 overlap serves as an exposure opening (frame) that functions as an opening for exposure in the focal-plane shutter. A photoelectric converting element such as, for example, a CMOS, a CCD, or the like, is disposed, as an imaging element (not shown) on the opposite side of the exposure opening from the imaging subject. This photoelectric converting element is an element that has a function for converting light into an electric signal, through illumination with light that passes through from the imaging subject side, through passing through the exposure opening, a lens, and the like, but is not limited to being a CMOS or a CCD. In the exposure opening (frame), the opening/closing state is changed through movement of the leading blade group 4 and the trailing blade group 5, which are driven by the driving mechanism portion 8, to enable light from the imaging subject side to pass through to the imaging element side when the exposure opening is in the opened state. The incident light that passes through this exposure opening from the imaging subject side arrives at the imaging element that is disposed behind the focal-plane shutter, where the light that is received by the imaging element is converted into an electric signal and outputted to a controlling portion (not shown), etc., to perform imaging. Note that film, or the like, may be provided instead of the imaging element described above, and, in the present invention, "imaging portion" is used as a general term for the imaging element, film, or the like.

<Leading Blade Group 4 and Trailing Blade Group 5>

The leading blade group 4 and the trailing blade group 5 are each driven by the driving mechanism portion 8, to operate so as to open and close the exposure opening (frame) that is defined by the opening portions 1a, 2a, and 3a. The leading blade group 4 and the trailing blade group 5 are structured from respective pluralities of strip-shaped blades (which are each essentially a rectangle or strip-shaped rectangle that that is thinner and longer in the lengthwise direction that the exposure opening), and are linked through the arms 6 to the driving mechanism portion 8. That is, the power generated by the driving mechanism portion 8 is relayed through the arms 6 to the leading blade group 4 and the trailing blade group 5, where the leading blade group 4 and the trailing blade group 5 undergo traveling operations thereby.

<Arms 6>

The arms 6 (6a through 6d) are each linked to the driving mechanism portion 8 and to the leading blade group 4 or trailing blade group 5, to relay the driving force of the driving mechanism portion 8 to the leading blade group 4 and the trailing blade group 5. More specifically, the arms 6a and 6d are linked rotatably to a driving pin (not shown) of the driving mechanism portion 8, and the arms 6c and 6d are linked rotatably to the base plate 1, without linking to the driving mechanism portion 8. Because of this, the arms 6a and 6d are driven by the driving mechanism portion 8, and the arms 6b and 6c operate synchronized to the movement of the arms 6a and 6d. The arms 6a and 6b are linked to the leading blade group 4, and the arms 6b and 6c are linked to the trailing blade group 5. Five linking holes, for example, are formed in each arm 6, with one linking hole used to link to the base plate 1, and the remaining for linking holes used to link to the blade group.

<Blade Dowel 7>

As depicted in FIG. 3 and FIG. 4, an arm 6 and a blade group are linked through crimping by the blade dowel 7. The head portion 7a of the blade dowel 7 protrudes in respect to the blade group (for example, the trailing blade group 5) and the arm 6, as depicted in FIG. 4, and when the shutter is operated to move the blade group, rubs against the base plate 1, the supplementary base plate 2, or the middle plate 3. Because of this, the blade dowel 7 in the present embodiment is subjected to the plating process described below in order to increase the friction durability thereof.

<Plating Treatment>

The blade dowel 7 is, for example, iron, and is plated using non-electrolytic nickel, or the like, at the time of manufacturing (prior to assembly), and then is subjected to a heating process to perform further precipitation hardening. The precipitation hardening treatment on the blade dowel 7 is carried out through a heating process for at least one hour at a precipitation hardening temperature of 600° C. In the blade dowel 7 whereon such a precipitation hardening treatment has been performed, the plated part is converted from a vitrified structure to a metal crystallized structure with crystallization degree of essentially 100%, with a hardness of between about Hv 600 and 750.

Note that the crystallization degree of the plating part of the blade dowel 7 being no less than 99% can increase the hardness of the plating part, and, more reliably, crystallization degree of essentially 100% is preferred.

Moreover, the precipitation hardening treatment may be a process for between 30 minutes and one hour and 30 minutes at a precipitation hardening temperature of between 570 and 630° C., which is within a 30° above or below 600° C. Having the precipitation hardening temperature be between 570° C. and 630° C. simplifies temperature control, while being a temperature that is sufficient for crystallizing the plating part. Moreover, in the precipitation hardening treatment, in some cases an adequate crystallization degree can be achieved even at about 30 minutes. When the precipitation hardening time is about 30 minutes, this can shorten the processing time in manufacturing, which can shorten the manufacturing time. Moreover, the precipitation hardening treatment can achieve adequately high crystallization degree if carried out for about one hour and 30 minutes.

The range of precipitation hardening temperatures may be between 590° C. and 610° C., which is within 10° above and below 600° C. In this case, the temperature control is relatively simple, and the temperature can be sufficient for crystallization of the plating part.

The blade dowel 7 that has been subjected to such a plating process will have high friction durability, and thus will have less of a tendency to become worn or damaged, even when there is friction when sliding during the shutter operation.

<Driving Mechanism Portion 8>

The driving mechanism portion 8 is disposed on the base plate 1, and is structured so as to cause the blade group to operate through a motive force using an electromagnet, a spring, or the like. When there is a shutter release by a user, or the like, in the imaging device, such as a camera, the driving mechanism portion 8 is actuated, and the motive force thereof is transmitted through the arms 6 to the leading blade group 4 and the trailing blade group 5. Through this, the leading blade group 4 and the trailing blade group 5 operate (travel) to carry out the exposure of the imaging element.

In the focal-plane shutter of the present embodiment, as described above, the blade groups and the arms 6 are linked using blade dowels 7 that have been subjected to plating with a metal crystallized structure of crystallization degree of essentially 100%, through the precipitation hardening treatment described above, and thus, despite friction during a shutter operation, this can prevent the production of wear debris from the blade dowel 7, and damage to the blade dowel 7.

In particular, in the present embodiment the plating of the metal crystallized structure of the blade dowel 7 is formed through a precipitation hardening treatment for no less than one hour at a precipitation hardening temperature of about 600° C. This enables the plating material to be converted into a metal crystallized structure with crystallization degree of essentially 100% through a relatively simple structure.

Note that in the embodiment set forth above, the explanation was for an example wherein the hardness of the plating part was between about Hv 60 and; however, the hardness may instead be between about Hv 400 and 750. In the focal-plane shutter according to the present embodiment, a blade dowel 7 wherein, in this way, the plating part has high hardness is used, and thus even if wear debris is produced, this can cause the size of the wear debris to be small, so that even if the wear debris were to adhere to the imaging element, this can prevent a reduction in the quality of the image that is captured.

<2. Supplementary Items>

An embodiment according to the present invention was explained in detail above. In the explanation above, the explanation used only a single embodiment, and the scope of the present invention is to be interpreted broadly, in a range that can be understood by a person skilled in the art based on similar technical concepts, rather than being limited to this single embodiment.

In the embodiment set forth above, blade dowels 7 were used in linking the arms 6 and the blade groups, but the structure may instead be one that uses couplings that are different from blade dowels.

While, in the embodiment set forth above, the explanation was for an example wherein rectangular opening portions 1*a*, 2*a*, and 3*a* were formed respectively in a base plate 1, a supplementary base plate 2, and a middle plate 3, there is no limitation to the opening portions formed in the base plate 1, the supplementary base plate 2, and the middle plate 3 being rectangular or essentially rectangular. That is, these opening portions may be formed in square shapes or essentially square shapes, or may be of other shapes.

Moreover, while in the embodiment set forth above the explanation was for only the parts that are of the distinctive features in the present invention, the focal-plane shutter according to the present invention may further comprise various structures found in conventional focal-plane shutters.

The focal-plane shutter according to the present invention is used as a structure for imaging devices, such as cameras, or the like, wherein there is less of a tendency to produce wear debris and less of a tendency for damage during shutter operations.

The invention claimed is:

1. A focal-plane shutter comprising:
    a base plate that has an opening portion for exposure;
    a blade group opening and closing the opening portion;
    an arm that is linked to a blade group; and
    a driving mechanism portion, linked to the arm, driving the blade group through the arm, wherein:
    the blade group and the arm are linked through a coupling plated with a metal crystallized structure with crystallization degree of no less than 99%.

2. The focal-plane shutter as set forth in claim 1, wherein:
    the coupling is plated with a metal crystallized structure with crystallization degree of essentially 100%.

3. The focal-plane shutter as set forth in claim 1, wherein:
    the plating of the metal crystallized structure is formed through a precipitation hardening treatment for no less than one hour at a precipitation hardening temperature of approximately 600° C.

4. The focal-plane shutter as set forth in claim 1, wherein:
    the plating of the metal crystallized structure is formed through a precipitation hardening treatment for no less than 30 minutes at a precipitation hardening temperature between 570° C. and 630° C.

5. The focal-plane shutter as set forth in claim 4, wherein:
the plating of the metal crystallized structure is formed through a precipitation hardening treatment for no more than one hour and 30 minutes.

6. The focal-plane shutter as set forth in claim 1, wherein:
the plating of the metal crystallized structure has an Hv hardness of no less than 400 and no greater than 750.

7. The focal-plane shutter as set forth in claim 6, wherein:
the plating of the metal crystallized structure has an Hv hardness of no less than 600 and no greater than 750.

8. An imaging device comprising a focal-plane shutter as set forth in claim 1.

* * * * *